(12) United States Patent
Liu et al.

(10) Patent No.: US 12,286,988 B2
(45) Date of Patent: Apr. 29, 2025

(54) RECTIFIER AND FLOWMETER

(71) Applicant: Honeywell International Inc., Charlotte, NC (US)

(72) Inventors: Rui Liu, Shanghai (CN); Wen Peng, Shanghai (CN); Dong Luo, Shanghai (CN); Li Yang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 302 days.

(21) Appl. No.: 17/901,370

(22) Filed: Sep. 1, 2022

(65) Prior Publication Data

US 2023/0074882 A1     Mar. 9, 2023

(51) Int. Cl.
  *F15D 1/02*     (2006.01)
  *G01F 1/66*     (2022.01)
  *G01F 15/00*    (2006.01)
  *G05D 11/13*    (2006.01)

(52) U.S. Cl.
  CPC ............ *F15D 1/025* (2013.01); *G01F 1/662* (2013.01); *G01F 15/00* (2013.01); *G05D 11/132* (2013.01)

(58) Field of Classification Search
  CPC ............... F16L 55/027; F16L 55/02709; F16L 55/02718; F16L 55/02763; F15D 1/02; G05D 11/132
  USPC .............. 138/37, 39, 40, 44; D23/213, 249; 239/428.5, 437
  See application file for complete search history.

(56) References Cited

U.S. PATENT DOCUMENTS

| | | | | |
|---|---|---|---|---|
| 3,840,051 | A | * | 10/1974 | Akashi ................... F15D 1/025 428/596 |
| 3,996,025 | A | | 12/1976 | Gulden |
| 5,495,872 | A | * | 3/1996 | Gallagher .............. F15D 1/025 138/40 |
| 5,762,107 | A | * | 6/1998 | Laws ...................... F15D 1/025 138/40 |
| 6,807,986 | B2 | * | 10/2004 | Boger ..................... F16K 47/08 138/44 |
| 7,089,963 | B2 | * | 8/2006 | Meheen ............... F15D 1/0005 138/40 |

(Continued)

FOREIGN PATENT DOCUMENTS

| | | |
|---|---|---|
| CN | 108007514 A | 5/2018 |
| CN | 216081636 U | 3/2022 |
| EP | 3745095 A1 | 12/2020 |

OTHER PUBLICATIONS

European search Report for corresponding EP Application No. 22193794.9; Jan. 24, 2023.

(Continued)

*Primary Examiner* — Patrick F Brinson
(74) *Attorney, Agent, or Firm* — Ortiz & Lopez, PLLC; Luis M. Ortiz; Kermit D. Lopez

(57) ABSTRACT

A rectifier and a flowmeter, the rectifier including a fairing, wherein a first rectifying section (1) positioned at the upstream, a reducing section (2) positioned at the midstream and a second rectifying section (3) positioned at the downstream, can be arranged in the fairing. The first rectifying section and the second rectifying section are respectively provided with a group of rectifying channels parallel to the flow direction of fluid, and a through-hole (21) can be formed in the reducing section. The rectifier can provide improved rectification effects.

9 Claims, 5 Drawing Sheets

(56) References Cited

U.S. PATENT DOCUMENTS

| | | | |
|---|---|---|---|
| 7,370,675 B2 * | 5/2008 | Cancade | F16L 55/02718 |
| | | | 137/550 |
| 2008/0246277 A1 * | 10/2008 | Gallagher | F16L 9/147 |
| | | | 285/148.13 |
| 2011/0076628 A1 * | 3/2011 | Miura | F23R 3/343 |
| | | | 431/12 |
| 2015/0240843 A1 | 8/2015 | Sawchuk et al. | |
| 2017/0009788 A1 | 1/2017 | Sawchuk | |

OTHER PUBLICATIONS

Chinese Patent Application No. CN202122119562.6U, filed Sep. 3, 2021; published as Chinese Publication No. CN216081636U.

* cited by examiner

RECTIFIER AND FLOWMETER

CROSS-REFERENCE TO RELATED APPLICATION

This patent application claims priority to Chinese Patent Application No. 202122119562.6, entitled "Rectifier and Flowmeter," which was filed on Sep. 3, 2021, the entire content of which is incorporated herein by reference. Chinese Patent Application No. 202122119562.6 published as Patent Application Publication No. CN216081636U on Mar. 18, 2022.

TECHNICAL FIELD

Embodiments are generally related to the field of fluid measurement, and more particularly, to a rectifier and a flowmeter that utilizes such a rectifier.

BACKGROUND

Flowmeters are widely used in a variety of fields. For example, an ultrasonic flowmeter can realize non-contact measurement with the advantages of high measurement precision, wide measurement range, convenient installation and maintenance, environmental protection, energy conservation and the like. Ultrasonic flowmeters are widely used in low measurement fields.

A flowmeter tube may be connected to a gas composition and used for intelligent metering with respect to the gas composition. Current ultrasonic gas flowmeters, however, are sensitive to flow fields, which may require the use of a lengthy upstream straight tube to develop the flow into a symmetrical flow field curve. In addition, similar requirements may exist for other flowmeters such as turbine flowmeters and the like.

It is therefore believed that a rectifier may be needed for use in a flowmeter or in the front end of a flowmeter to achieve a required symmetric flow field so as to reduce the length of the aforementioned upstream straight pipe and save installation space.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved rectifier offering improved rectification effects.

It is another aspect of the embodiments to provide for an improved rectifier that can be adapted for use with a flowmeter.

The aforementioned aspects and other objectives can now be achieved as described herein. In an embodiment, a rectifier may include a cowl, a first rectifying section located upstream, a reduced diameter section located midstream, and a second rectifying section located downstream. The first rectifying section located upstream, the reduced diameter section located midstream, and the second rectifying section located downstream may be included in the cowl. The first rectifying section and the second rectifying section each can have a plurality of rectifying passages parallel to a flow direction of a fluid, while a through-hole may be provided in the reduced diameter section.

In an embodiment of the rectifier, the ratio of the diameter of the outlet of the through hole of the reducing section to the diameter of the upstream can be, for example, 0.3-0.9.

In an embodiment of the rectifier, the diameter of the through-hole can be configured to be smaller in the flow direction of the fluid.

In an embodiment of the rectifier, the included angle between the side wall of the reducing section and the flowing direction of the fluid can be, for example, 3 degrees to 90 degrees.

In an embodiment of the rectifier, a side wall channel can be arranged in a side wall of the reducing section, and fluid can pass through the side wall channel, and the extending direction of the side wall channel is parallel to the flowing direction of the fluid.

In an embodiment of the rectifier, a plurality of side wall channels can be arranged in the side wall of the reducing section, and the side wall channels can be symmetrically distributed around the center line of the fairing.

In an embodiment of the rectifier, a flow straightener can be provided having one or more side wall channel rings in the side wall of the reducing section.

In an embodiment of the rectifier, the rectifying channel can be arranged to be distributed on the cross section of the fairing, which can be positioned on the first rectifying section and/or the second rectifying section along the flowing direction of the fluid.

In an embodiment of the rectifier, the rectifying channel of the first rectifying section, the rectifying channel of the second rectifying section or the side wall channel of the reducing section can be selected from one or more of the following shapes: circular and polygonal.

In an embodiment of the rectifier, the fairing can be constructed in one piece or may be integrated in sections with the first fairing section, the reduced diameter section and the second fairing section, respectively.

In an embodiment of the rectifier, a flowmeter may include the aforementioned rectifier.

Advantages of the embodiments can result from rectifying the fluid through a rectifying passage in the upstream first rectifying section; then at least partially converging the fluid at the inner edge of the fairing towards the center of the fairing by utilizing the reducing section at the midstream, mixing the fluid, particularly mixing asymmetric high-speed low and low-speed flow, and improving the uniformity of the fluid. Finally, the fluid can be homogenized and rectified again by the second rectifying section located at the downstream, and the vortex in the fluid can be reduced. The rectifier has the advantages of good flu uniformity, small pressure loss, low energy consumption and small overall size.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Like reference symbols or reference numerals in the various drawings indicate like elements.

DETAILED DESCRIPTION

Figure 1:
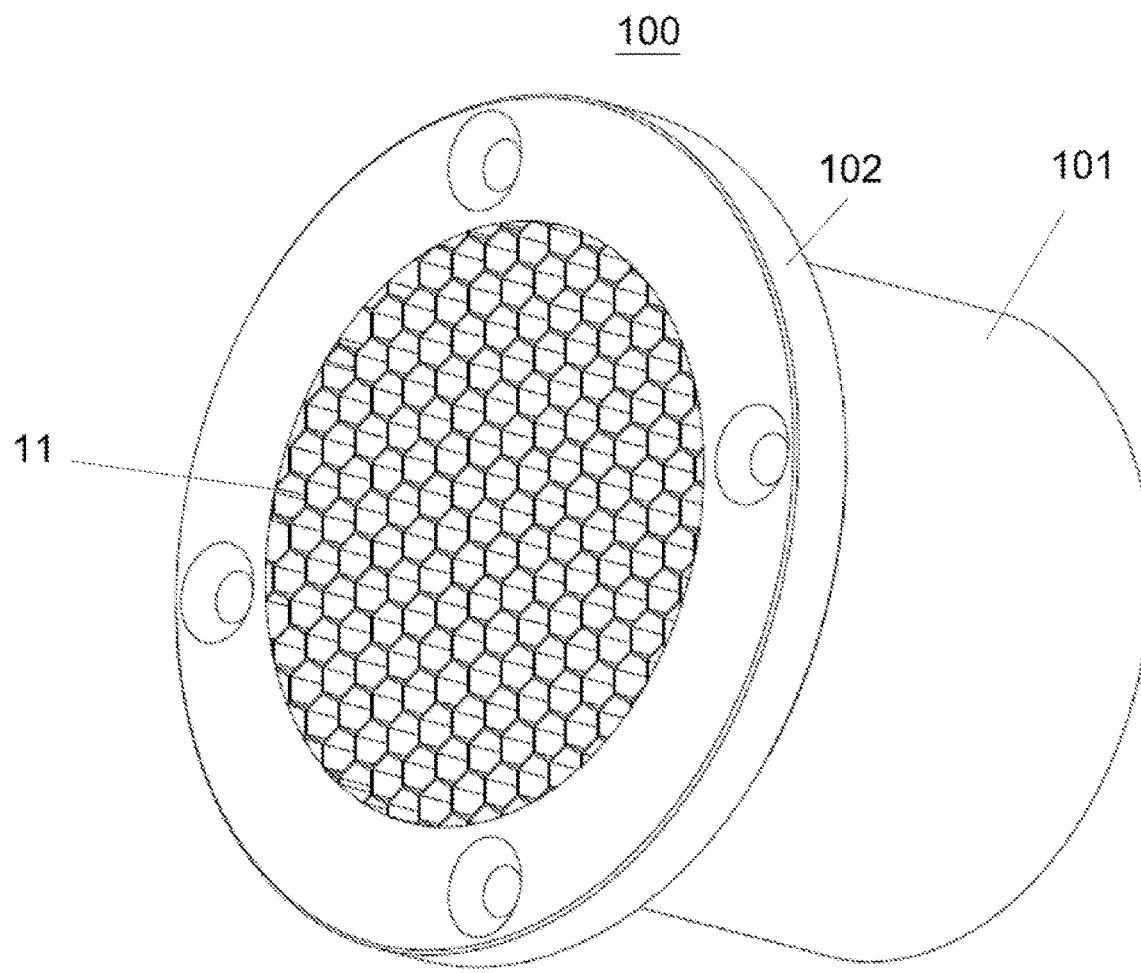
FIG. 1 illustrates a schematic diagram of a perspective view of a rectifier according to an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment. Similarly, the phrase "in another embodiment" or "in another example embodiment" and variations thereof as utilized herein may or may not necessarily refer to a different embodiment. It is intended, for example, that claimed subject matter may include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. The term "at least one" may refer to "one or more". For example, "at least one widget" may refer to "one or more widgets."

Referring to FIG. 1 to FIG. 4, a rectifier 100 according to an embodiment can include a fairing 101, in which a first rectifying section 1 is positioned at an upstream location, a reduced diameter section 2 is positioned at a midstream location, and a second rectifying section 3 is disposed at a downstream location. The first rectifying section 1 includes a plurality of rectifying channels 11 parallel to a flow direction of a fluid flow through the rectifier 100. The second rectifying section 3 includes a plurality of rectifying channels 31 parallel to the flow direction of the fluid flowing through the rectifier 100. A through-hole 21 can be disposed in the reduced diameter section 2. The aforementioned fluid may be a gas or a liquid. Note that the terms "upstream", "midstream" and "downstream" are in terms of the direction of the flow of the fluid. Specifically, the fluid can flow in from the upstream of the rectifier 100 can flow out from the downstream of the rectifier 100, i.e., the flow direction of the fluid is shown horizontally from left to right in FIG. 2.

A circular fluid passage can be disposed within the fairing 101. The outer contour of the first fairing section, the reducing section, and the second fairing section can be rolled into the fairing 101 to match to match the shape of the fluid channel. The flange 103 can be provided on the outside of the fairing 101 for mounting fairing 101 to a fluid line or a flowmeter. Note that the term "reduced diameter section" and variations thereof to this term as utilized herein can mean that the diameter of the fluid passage is reduced, i.e., the fluid may not flow completely unimpeded through the interior of the fairing 101. For example, the reduced diameter section can act to constrain flow of the fluid at the inner edge of the fairing 101 and not at the center of the fairing 101.

In the rectifier 100, the fluid can be first rectified by a rectifying channel in the first rectifying section located upstream. Then, the fluid can be at least partially converged at the inner edge of the fairing towards the center of the fairing 101 by utilizing the reducing section at the midstream, mixing the fluid, particularly mixing asymmetric high-speed flow and low-speed flow, which also improves the uniformity of the fluid. Finally, the fluid can be homogenized and rectified again by the second rectifying section located at the downstream, with a result that the vortex in the fluid is reduced. The fluid that finally flows out from the rectifier 100 will possess a better or enhanced rectification effect. The fluid pressure loss here may be miniscule, and the energy consumption is low with good fluid homogeneity. The rectifier 100 can be configured with a smaller size than that of traditional rectifiers used in fluid flow measurement applications.

Figure 2:
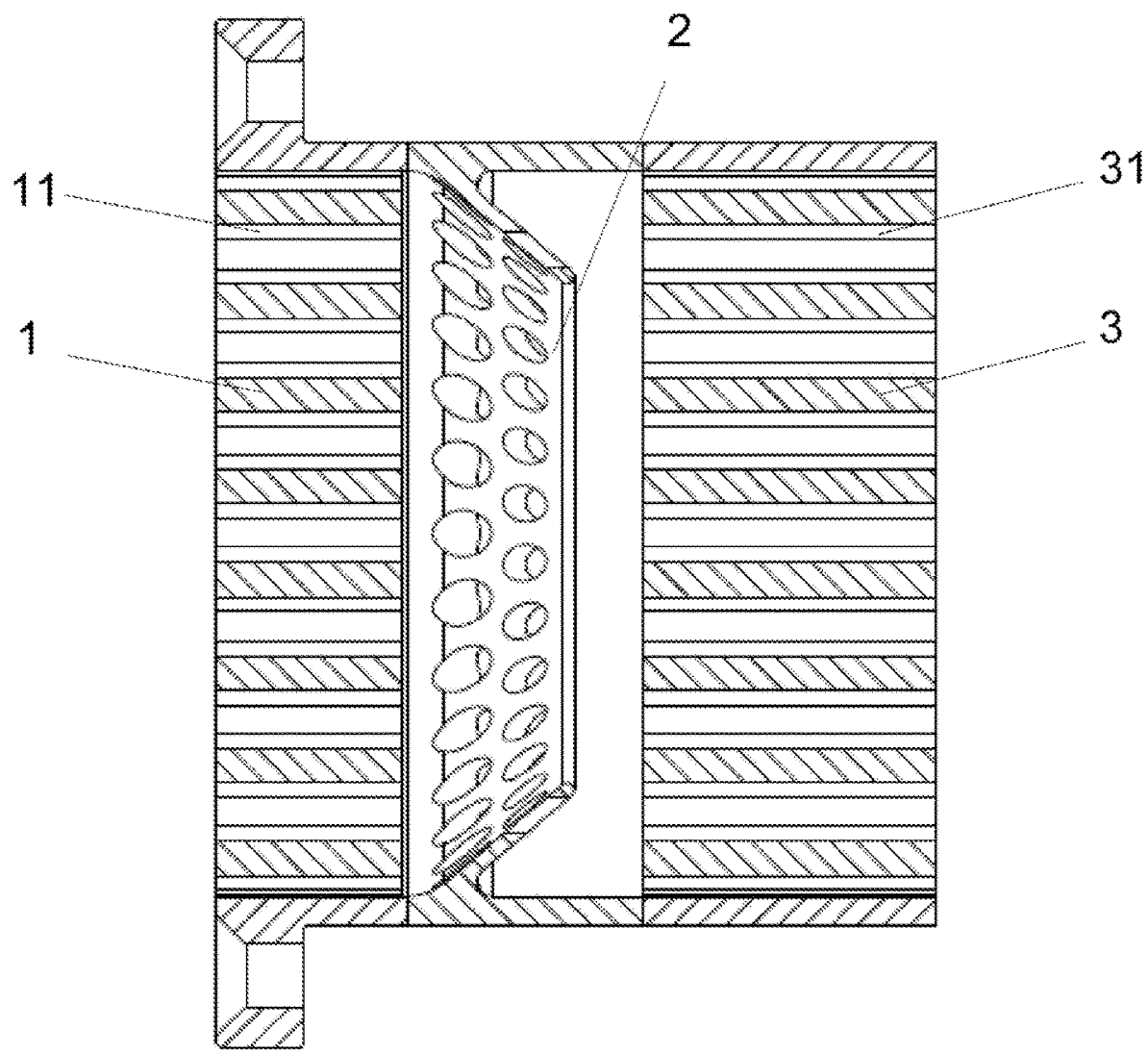
FIG. 2 illustrates a schematic diagram depicting a sectional view of the rectifier shown in FIG. 1, in accordance with an embodiment.
Figure 3:
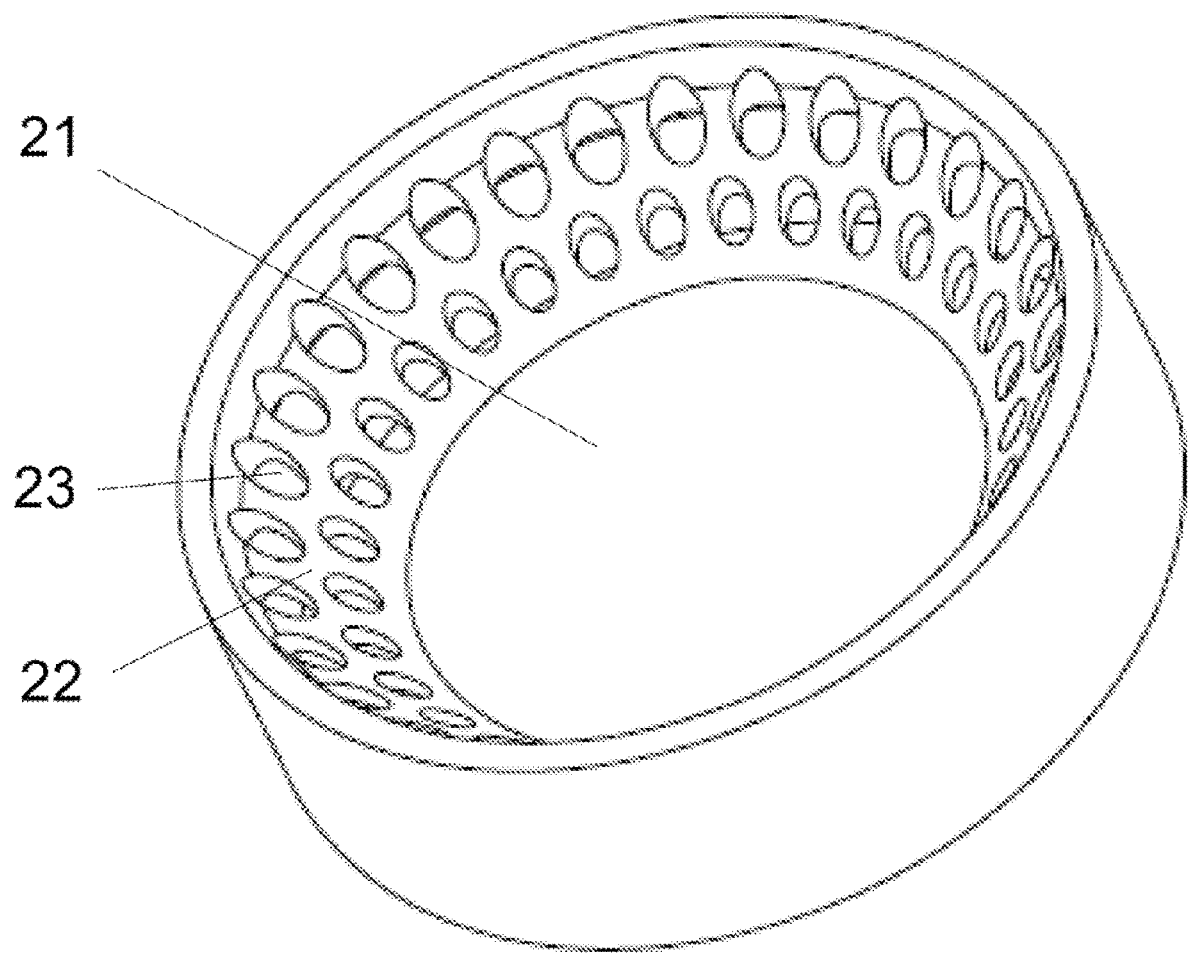
FIG. 3 illustrates a schematic diagram depicting a perspective view of a portion of the rectifier shown in FIG. 1, in accordance with an embodiment.
Figure 4:
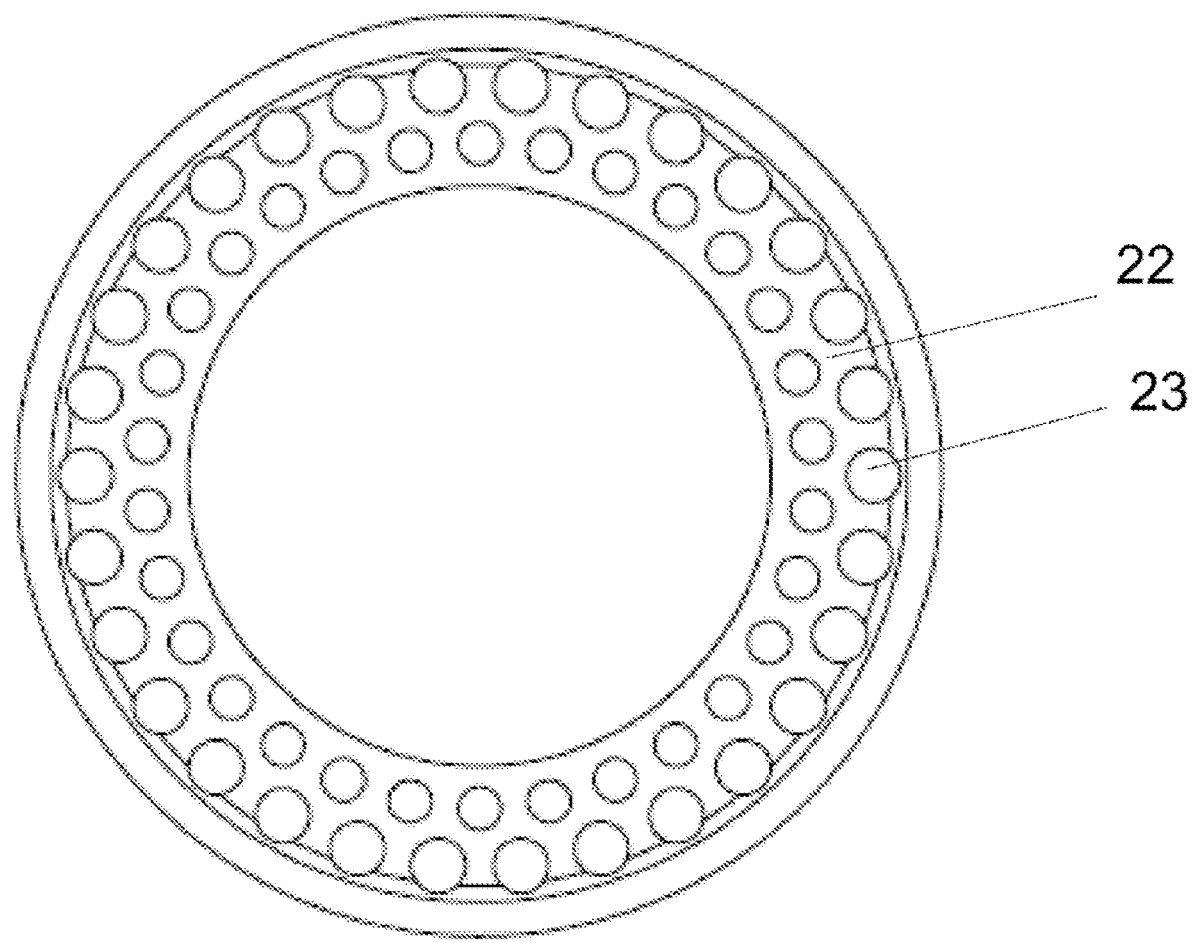
FIG. 4 illustrates a schematic diagram depicting a front view of the rectifier shown in FIG. 1 with a reduced diameter section, in accordance with an embodiment.
Figure 5:
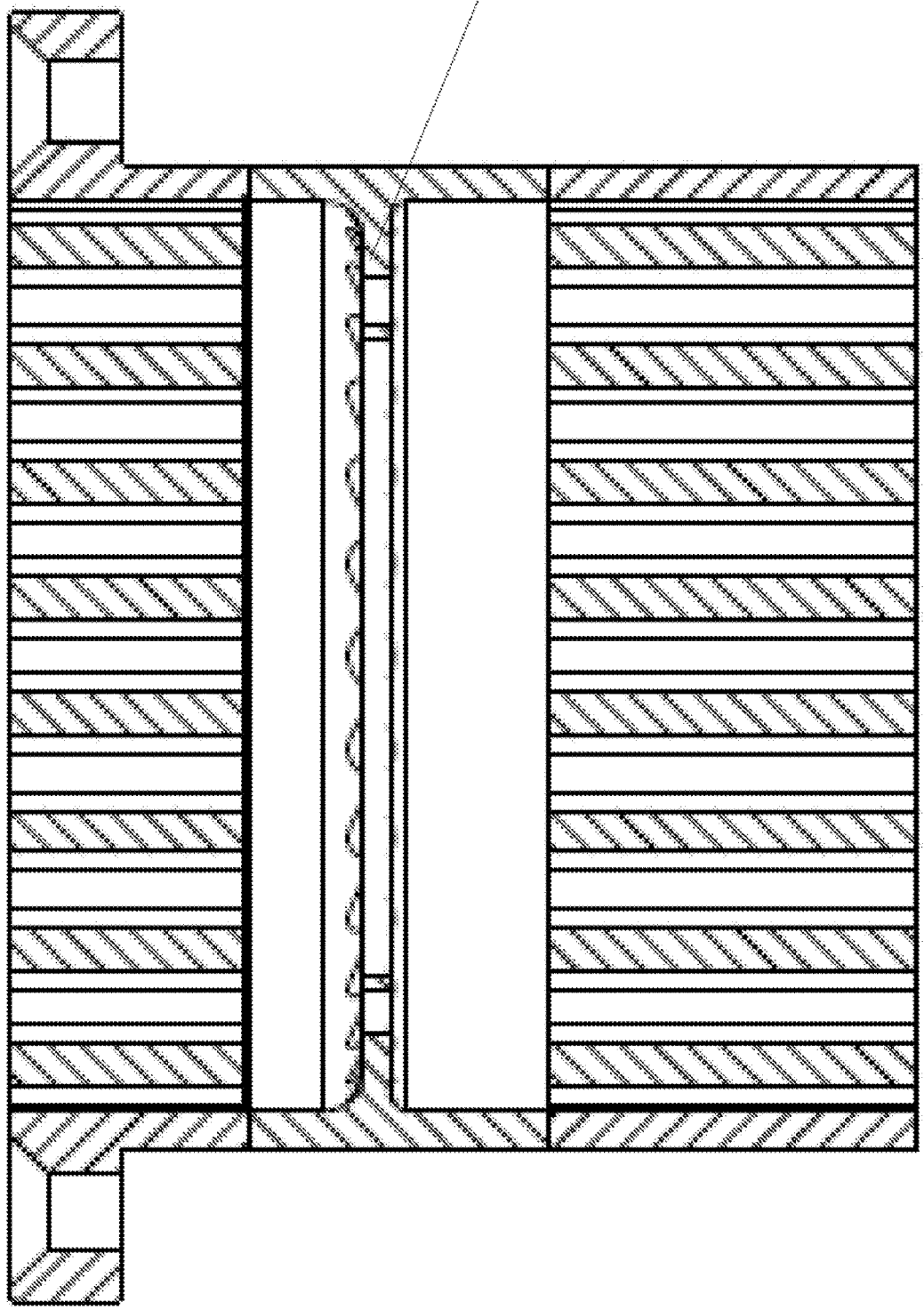
FIG. 5 illustrates a schematic diagram depicting a cross-sectional view of the rectifier shown in FIG. 1, in accordance with another embodiment.

As shown in FIG. 2, the diameter of the through-hole outlet is smaller than the diameter at the upstream. The ratio of the diameter of the outlet of the through-hole to the diameter of the upstream (i.e., the ratio of the diameter of the innermost circle to the diameter of the second circle from the outside inwards in 0 g. 4) is 0.3 to 0.9, such as 0.5 to 0.8. In the embodiment shown in the figures, the diameter of the through-opening 21 can be configured to be smaller in the direction of flow of the fluid. For example, the side wall 22 of the reduced diameter section may be configured in a straight line, so that the diameter of the through-opening 21 changes continuously, in which case the reduced diameter section can be configured substantially in the shape of a truncated cone. Illustratively, the side wall of the reducing section can form an angle of 3-90 degrees, such as 20-60 degrees, with the flowing direction of the fluid. Referring to FIG. 5, the side wall 22 of the reducer section can be angled approximately 90° to the direction of flow of the fluid.

In the side wall 22 of the reducing section, a side wall channel 23 can be provided, through which a fluid can pass, the side wall channel extending in a direction substantially parallel to the flow direction of the fluid. The projection of the side wall channel 23 in the cross section perpendicular to the flowing direction of the fluid can be circular or approximately circular. The diameter of each side wall channel can be adjusted according to the diameter of the fluid channel, for example, the diameter of the side wall channel can be set to 2 mm-10 mm. One or more sidewall channels may be provided in the sidewall of the reduced diameter section, the sidewall channels being symmetrically distributed about the centerline of the fairing 101. The sidewall channels that are at the same distance from the centerline of the fairing 101 can be referred to as a sidewall channel ring, with each sidewall channel ring having, for example, 4-50 sidewall channels.

A plurality of side wall channel rings, as shown in FIG. 2, may be provided in the side wall of the reducing section. The specific number of side wall channel rings among the plurality of side wall channel rings can be adjusted according to the diameter of the fluid channel, and can be set to 1-5 rings, for example. The sidewall channels in each sidewall channel ring may be configured identically in size and shape.

The fairing channel can be arranged to be distributed over the cross section of the fairing 101 at the first fairing section and/or the second fairing section in the fluid flow direction. That is, the rectifying channels of the first rectifying section and/or the second rectifying section may be full of the fluid channels of the recti0er. Referring to FIG. 1, a fairing channel 11 can be provided across the cross section of the fairing 101 at the first fairing section in the direction of fluid flow. The center line of the first fairing section, the center line of the second fairing section and the center line of the reducing section coincide, for example, with the center line of the flow channel of the fairing.

The rectifying channel of the first rectifying section, the rectifying channel of the second rectifying section or the sidewall channel of the reducing section can be selected from one or more of the following shapes: circular and polygonal. Examples of polygons are triangles, quadrilaterals, hexagons, and the like. For example, the rectifying channels of the first rectifying section and the rectifying channels of the second rectifying section may be selected to be regular hexagons (i.e., honeycomb cell shapes), whereby the first rectifying section and the second rectifying section can be configured to be honeycomb-shaped (see FIG. 1); the side wall channels of the reducing section can be chosen to be circular (see FIG. 4). The size and shape of each rectifying channel may be configured to be the same.

As shown in FIG. 2, the fairing can be segmentally integrated with the first fairing section, the reduced diameter section, and the second fairing section, respectively; specifically, a first segment of the fairing can be integrally fabricated with a first fairing segment, a second segment of the fairing can be integrally fabricated with a reduced diameter segment, and a third segment of the fairing can be integrally fabricated with a second fairing segment. Of course, the fairing 101 may also be constructed in one piece, into which the first fairing section, the reduced diameter section and the second fairing section can be then inserted in each case.

An embodiment may be configured to include a flowmeter with the rectifier 100 according to any one or more of the embodiments described above, the features and effects of which are therefore the same as those described above and will not be described in detail herein. The flowmeter can be for example a gas flowmeter and in particular, an ultrasonic gas flow meter. The flow straightener can be preceded by a flowmeter or the flow straightener can be located at the fluid inlet in the flowmeter.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A rectifier, comprising:
a fairing comprising a first fairing section positioned in an upstream location, a reducing section positioned in a midstream location and a second fairing positioned in a downstream location, wherein the first fairing section and the second fairing section each include a plurality of fairing channels parallel to a direction of a flow of a fluid, the reducing section having a through-hole therein, wherein a diameter of the through-hole is smaller outlet as compared to a diameter at an upstream location and wherein the reducing section comprises side wall channels through which the fluid passes, the side wall channels extending in a direction parallel to the direction of the flow of the fluid.

2. The rectifier of claim 1 wherein a ratio of a diameter of the reducing section to a diameter of the upstream location is 0.3 to 0.9.

3. The rectifier of claim 1 wherein the reducing section comprises side walls angled 3 degrees to 90 degrees with the respect to the direction of the flow of the fluid.

4. The rectifier of claim 1 wherein a plurality of sidewall channels are provided in a sidewall of the reducing section, wherein the plurality of sidewall channels are symmetrically distributed about a centerline of the fairing.

5. The rectifier of claim 4 wherein at least one side wall channel ring is provided in sidewalls of the reducing section.

6. The rectifier of claim 1 further comprising low straightener passages arranged to extend across a cross-section of a flow straightener of the fairing at a first flow straightener section and/or a second flow straightener section.

7. A rectifier, comprising:
a fairing comprising a first rectifying section positioned in an upstream location, a reducing section positioned in a midstream location and a second rectifying positioned in a downstream location, wherein the first rectifying section and the second rectifying section each include a plurality of rectifying channels parallel to a direction of a flow of a fluid, wherein the reducing section comprises a through-hole therein and wherein the reducing section comprises side wall channels through which the fluid passes, the side wall channels extending in a direction parallel to the direction of the flow of the fluid.

8. The rectifier or claim 7 wherein the rectifying channels of the first rectifying section, the rectifying channels of the second rectifying section, or wherein the reducing section comprises sidewall channels selected from at least one of the following shapes: a circular shape and a polygonal shape.

9. The rectifier of claim 7 wherein a ratio of a diameter of the reducing section to a diameter of the upstream location is 0.3 to 0.9.

* * * * *